No. 620,892. Patented Mar. 14, 1899.
J. S. DETRICK.
MACHINE FOR MAKING ALL TOBACCO CIGARETTES.
(Application filed Apr. 22, 1897.)
(No Model.) 2 Sheets—Sheet 1.
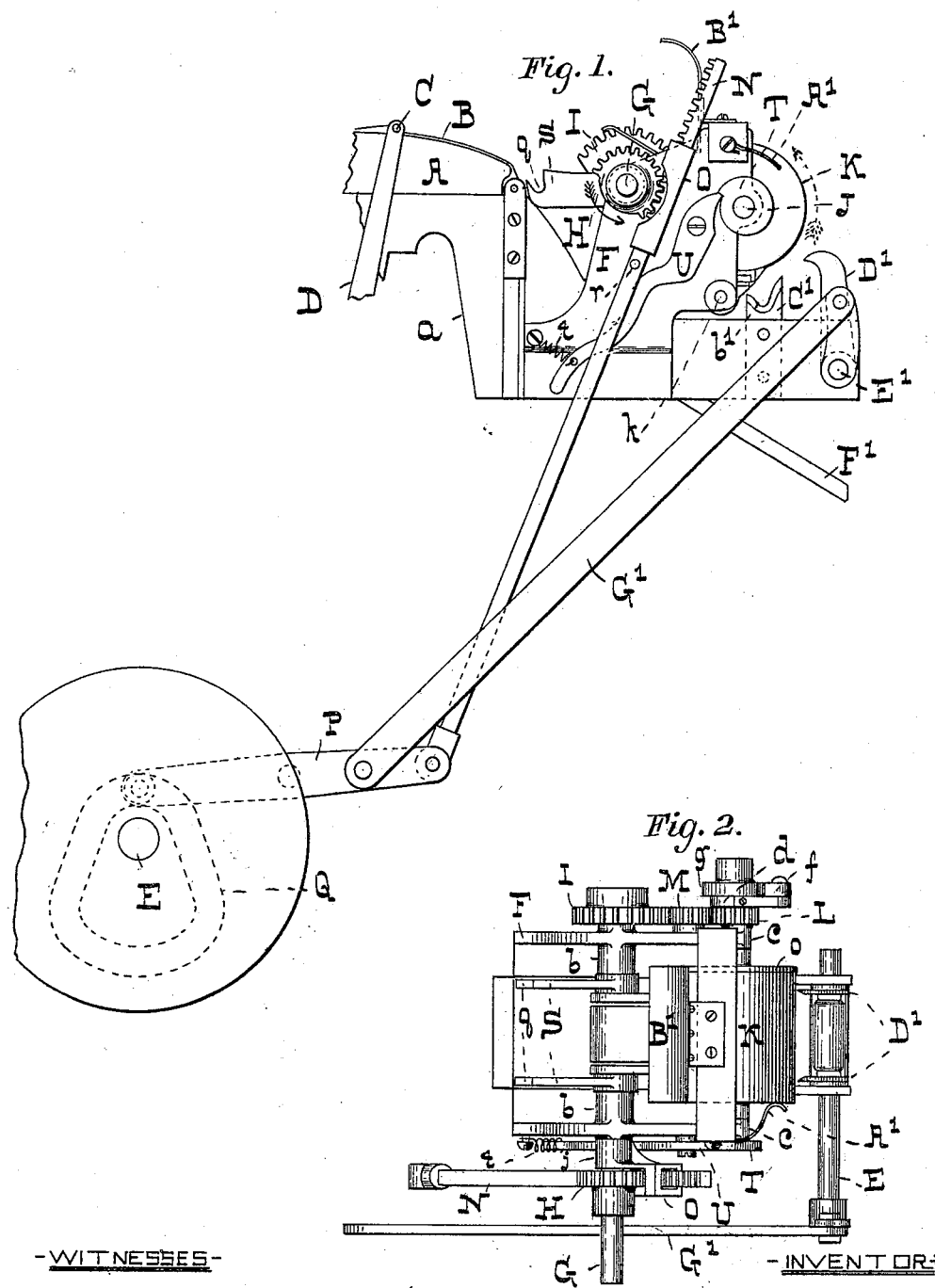
WITNESSES
Dan'l Fisher
H. Constantine
INVENTOR
Jacob S. Detrick,
by W. T. Howard,
Atty.

No. 620,892. Patented Mar. 14, 1899.
J. S. DETRICK.
MACHINE FOR MAKING ALL TOBACCO CIGARETTES.
(Application filed Apr. 22, 1897.)
(No Model.) 2 Sheets—Sheet 2.
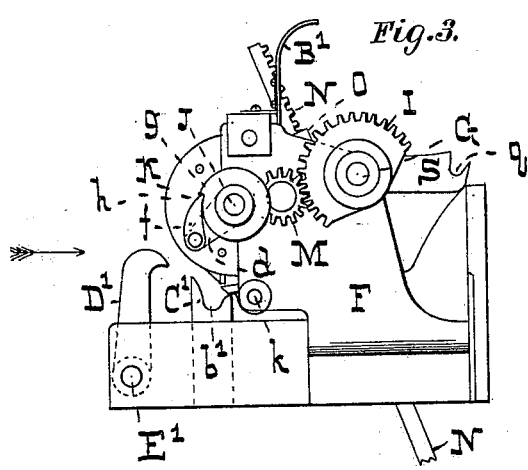
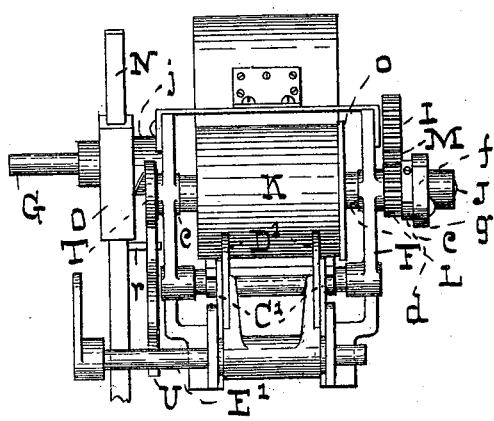
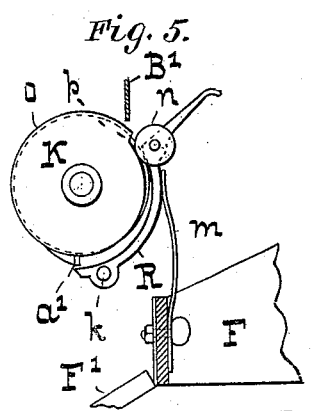
WITNESSES
Dan'l Fisher
H. Constantine
INVENTOR
Jacob S. Detrick,
by W. T. Howard,
atty.

UNITED STATES PATENT OFFICE.

JACOB S. DETRICK, OF BALTIMORE, MARYLAND.

MACHINE FOR MAKING ALL-TOBACCO CIGARETTES.

SPECIFICATION forming part of Letters Patent No. 620,892, dated March 14, 1899.

Application filed April 22, 1897. Serial No. 633,213. (No model.)

*To all whom it may concern:*

Be it known that I, JACOB S. DETRICK, of the city of Baltimore and State of Maryland, have invented certain Improvements in Machines for Making All-Tobacco Cigarettes, of which the following is a specification.

This invention relates to mechanism adapted for attachment to the delivery end of the rolling-up apron and table of an all-tobacco-cigarette machine to receive the cigarettes, straighten and smooth them, and finally cut off their ragged ends and bring them to a uniform length. The apparatus is also adapted when an unformed cigarette, or one in which the edges of the wrapper are not united and pasted together, so as to confine the filler, is presented to separate it from those which are perfect, and thereby prevent the scattering of loose tobacco and wrappers among completed cigarettes, as will hereinafter fully appear.

In the description of the said invention which follows reference is made to the accompanying drawings, forming a part hereof, in which—

Figure 1 is an exterior side view of a part of the cigarette-machine proper, together with the mechanism which forms the subject of the present invention. Fig. 2 is a plan of the same. Fig. 3 is a view the reverse of Fig. 1, except that certain parts of the cigarette-machine proper are omitted. Fig. 4 is a view of Fig. 3, looking in the direction indicated by the arrow. Fig. 5 is a detail of the invention.

Referring now to the drawings, A illustrates the delivery end of the rolling-up table, secured to the frame $a$, and B the apron. The forming-rolling is denoted by C and the arm for operating it by D.

E is a shaft forming a part of the machine, which makes one rotation for each double stroke of the forming-roller arm D.

F is a frame of any suitable construction secured to the main frame $a$ of the machine.

G is a shaft adapted to turn in the bearing-boxes $b$ on the frame F.

H and I are toothed pinions or sectors on the ends of the shaft G.

J is another shaft in bearing-boxes $c$ on the frame F, carrying the drum K, which is secured thereto. The said shaft has a toothed pinion L, which is loose thereon, and the pinion is driven from the toothed sector I through the medium of the idle-pinion M. To the outer face of the pinion L is fastened an arm $d$, having a pawl $f$, which rests on the circumference of a collar $g$. The collar has one notch $h$ (see Fig. 3) and is tight on the shaft J. From this it will be seen that when the toothed sector H is turned in the direction indicated by the curved arrow in full lines in Fig. 1 the drum will be rotated in the direction indicated by the dotted arrow through the medium directly of the pawl $f$, and that when the said sector is rotated in a contrary direction the pawl $f$ becomes inoperative and the drum is not rotated.

To effect the operation of the sector H in a forward and backward direction, I provide a toothed rack N, adapted to slide in a guide O, having a hub $j$, the whole being loose on the shaft G. The teeth of this rack are in gear with those of the sector H, a part of the face of the guide being cut away to admit of this engagement.

The rack N is operated from any part of the machine which will give a stroke at each movement of the forming-roller, and it is shown as connected to the end of the lever P, which derives its motion from a cam Q, shown in dotted lines as on the shaft E. (See Fig. 1.)

R is a curved plate loose on the fixed shaft $k$, the ends of which are supported in the frame F. A spring $m$, projecting from the frame F, bears against the upper end of this curved plate and keeps it yieldingly against the face of the drum K.

The lower or pivoted end of the curved plate R stands away from the drum a distance equal to the diameter of the cigarettes, and the upper end of the plate is provided with a roller $n$ at one side, which bears against a flange $o$ at one end of the drum. A portion of this flange is cut away to form a notch or depression $p$, into which the roller $n$ drops, as shown in Fig. 5. When the roller is in the notch, the upper end of the plate R bears against the periphery of the drum K; but when it is on the circular part of the flange the upper end of the plate is carried out, so as to make its inner surface concentric with the circumference of the drum K. This construction forms a channel of a uniform width equal to the diameter of the cigarette, and in passing through the channel the cigarette is not only straightened, but smoothed.

The means for carrying cigarettes from the rolling-up table to the entrance end of the channel consist of the arms S, which are secured to the shaft G. Their outer ends are notched, so as to hold the cigarette, and they have a vibratory movement in common with the shaft G, or they are moved from the position shown in Fig. 1 to one which brings their ends over the point of contact of the plate R with the drum K. In this movement a cigarette discharged from the rolling-up apron into the notches $q$ of the arms S is carried by them to the entrance end of the channel, which until the arrival of the cigarette is closed, as shown in Fig. 5.

The train of gearing described, together with the longitudinal movement of the rack-bar N, is arranged so as to effect one complete rotation of the drum K for each cigarette delivered thereto by the arms S, and in order that the drum may always stop with the roller in the notch $p$ I provide one end of the shaft J with a notched disk T and the frame F with a pawl U, the upper end of which enters the notch in the disk. (See Fig. 1.) This pawl is mechanically removed from its notch immediately before the drum begins its rotation, and this movement is effected by a pin $r$ on the rack-bar N striking the tailpiece of the pawl, which is curved to receive it.

To prevent any recoil of the drum when the pawl U stops, I employ a spring-brake A', which bears on one end of the drum. (See Figs. 1 and 2.) The tailpiece of the pawl U is connected to the frame F by a spring $t$.

A plate B' serves to guide the cigarettes delivered from the rolling-up table to the proper position on the circumference of the drum or at the junction of the drum and the curved plate R.

On the periphery of the drum K is a longitudinally-extending flange $a'$, which serves to scrape the curved inner surface of the plate R and remove therefrom any particles of tobacco which may have adhered thereto. It further serves to carry any cigarettes through the channel which may have lodged therein and have not been discharged by the rotation of the drum.

C" C' are fixed knives into the notches $b'$ of which the cigarettes after they have passed through the channel between the drum and curved plate are deposited. In connection with these fixed knives are the movable ones, D', on the shaft E'. These knives are drawn down by the link G' and pass between the ones C', so that the cigarettes after the ends are clipped off are pushed downward and allowed to fall into the chute F', which conducts them to any suitable receptacle placed to receive them.

Supposing the parts of the apparatus to be in the relative positions shown in Fig. 1 of the drawings, the operation of the invention is as follows: As a cigarette is discharged by the forming-roller it falls into the notches $q$ of the arms S, and in the rotation of the cam Q the rack-bar N is drawn down, which causes the said arms to be thrown over and the cigarette to be deposited at the junction of the curved plate R and the circumference of the drum K, where it rests for a moment.

In the downward motion of the rack-bar N the pin $r$ strikes the tailpiece $s$ of the pawl U, and the end of the pawl is thereby withdrawn from the notch in the disk T. The drum K is now in condition for rotation, and about simultaneously with the action of the pawl the drum begins to rotate in the direction before stated. The drum at this time being in the position shown in Fig. 5 it will be seen that at the first motion the roller $n$, which is connected to the upper part of the curved plate R, is struck by the portion of the flange $o$ which adjoins the notch $p$, in which the roller has been resting. This causes the curved plate to move outward, so as to make the channel formed between the drum and curved plate of a uniform width, which is the same as the diameter of the cigarette. The cigarette then falls into this channel, and in the rotation of the drum is rolled around the curved inner surface of the plate and discharged in a straight and smooth condition into the notches $b'$ of the fixed knives C'. The movable knives D' are then drawn down and made to pass across the ends of the fixed knives, and in this operation the ragged ends of the cigarette are clipped off and the completed cigarette falls to the chute F', which carries it to any suitable receptacle placed for its reception. In the beginning of the upward movement of the rack-bar the pawl U comes again into contact with the edge of the disk T, so that when the drum has completed its full rotation it is stopped suddenly by the pawl U engaging with the tooth on the disk T, and the drum remains in this position until it is required to roll another cigarette.

By making the cigarette on its delivery from the machine proper first fall on the arms S those cigarettes which are imperfect or not wrapped fall between the said arms and are not carried to the knives and deposited with the perfect cigarettes. Before the application of this invention to the cigarette-machine the loose tobacco filler from an imperfect cigarette would be mixed with the perfect ones and adhere to the wrappers having any exposed pasted surface. The present invention entirely obviates the mixing of loose tobacco with perfected cigarettes.

I claim as my invention—

1. In combination with the delivery end of a machine for making all-tobacco cigarettes, a drum with means to intermittingly rotate it, a curved plate around the drum with its upper edge normally in contact with the drum, devices to move the upper edge of the curved plate away from the drum as the drum begins its rotation, and thereby form a channel into which the cigarette is delivered and through which it is carried by the rotation of the drum, and mechanism to transfer cigarettes from the machine to the drum, substantially as specified.

2. In combination with the delivery end of a machine for making all-tobacco cigarettes, a drum with means to effect its intermittent rotation, a cam-flange on one end of the drum, a hinged or pivoted curved plate around the drum having a roller which rests on the cam-flange, means to keep the roller in contact with the cam and thereby normally hold the upper edge of the curved plate in contact with the surface of the drum, and mechanism to transfer cigarettes from the machine to the drum, substantially as specified.

3. In combination with the delivery end of a rolling-up table and apron of a machine for making all-tobacco cigarettes, a drum and means to intermittingly rotate the same, a hinged curved plate around and adjacent to the drum, means to intermittingly move the upper edge of the said plate to and away from the drum, and mechanism to transfer cigarettes from the machine to the drum, substantially as specified.

4. The combination with cigarette-forming mechanism, of a rerolling mechanism to which the cigarettes are delivered therefrom comprising a curved cigarette-support along which the cigarette is rolled and a movable member conforming substantially thereto and coacting therewith to roll the cigarette, connections for operating the latter member, and means for temporarily closing the entrance to the passage between the two members of the rerolling mechanism before each cigarette delivery so as to arrest and straighten out the cigarettes sidewise before their entrance into the passage, substantially as described.

5. The combination with cigarette-forming mechanism, of a rerolling mechanism to which the cigarettes are delivered therefrom comprising a cigarette-support along which the cigarette is rolled and a movable member coacting therewith to roll the cigarette, connections for operating the latter member, and means for temporarily closing the entrance to the passage between the two members of the rerolling mechanism before each cigarette delivery so as to arrest and straighten out the cigarettes sidewise before their entrance into the passage, substantially as described.

JACOB S. DETRICK.

Witnesses:
GEO. E. TAYLOR,
WM. T. HOWARD.